(12) United States Patent
Mangino

(10) Patent No.: US 10,782,675 B2
(45) Date of Patent: Sep. 22, 2020

(54) SENSOR MOUNTING ASSEMBLY FOR MACHINE CONDITION MONITORING

(71) Applicant: Analog Devices, Inc., Norwood, MA (US)

(72) Inventor: John Martin Mangino, Natick, MA (US)

(73) Assignee: Analog Devices, Inc, Norwood, MA (US)

(*) Notice: Subject to any disclaimer, the term of this patent is extended or adjusted under 35 U.S.C. 154(b) by 7 days.

(21) Appl. No.: 16/219,392

(22) Filed: Dec. 13, 2018

(65) Prior Publication Data

US 2020/0192338 A1 Jun. 18, 2020

(51) Int. Cl.
*H05K 1/00* (2006.01)
*G05B 19/418* (2006.01)
*G05B 23/02* (2006.01)
*G05B 19/048* (2006.01)

(52) U.S. Cl.
CPC ..... *G05B 19/41805* (2013.01); *G05B 19/048* (2013.01); *G05B 19/4184* (2013.01); *G05B 23/0235* (2013.01)

(58) Field of Classification Search
USPC .......................................................... 361/748
See application file for complete search history.

(56) References Cited

U.S. PATENT DOCUMENTS

| 7,499,283 B2 * | 3/2009 | De Los Santos | |
| 2008/0144302 A1 * | 6/2008 | Rosenblatt | G08B 17/10 361/809 |

* cited by examiner

*Primary Examiner* — Andargie M Aychillhum
(74) *Attorney, Agent, or Firm* — Schwegman Lundberg & Woessner, P.A.

(57) ABSTRACT

A sensor node with a mounting assembly and methods of using the same for affixing a sensor node to a machine to detect, isolate, and diagnose machine faults are discussed. An exemplary mounting assembly includes a base with a substantially centered through hole, and a fixation member operatively to pass through the through hole and engage the base. The sensor node includes a circuit board with circuitry to sense information of machine characteristic. The circuit board defines a guide hole concentrically aligned with the through hole on the base to allow the fixation member to pass through said holes. The base can be fixed directly to the machine by the fixation member, or via a mounting pad. A network of sensor nodes may communicate with a cloud-based computing device that provides a cloud-based service to detect a machine fault or to diagnose a fault type.

19 Claims, 10 Drawing Sheets

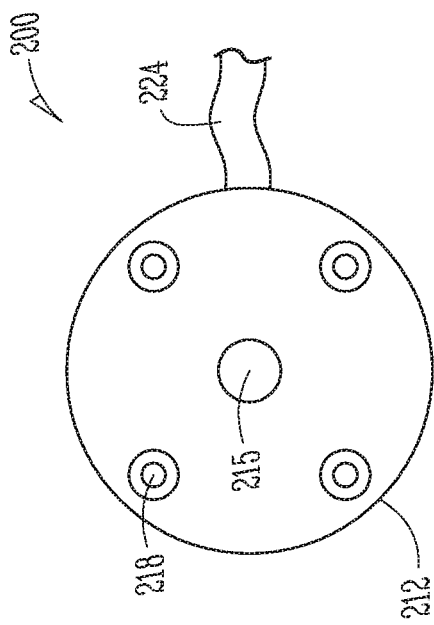
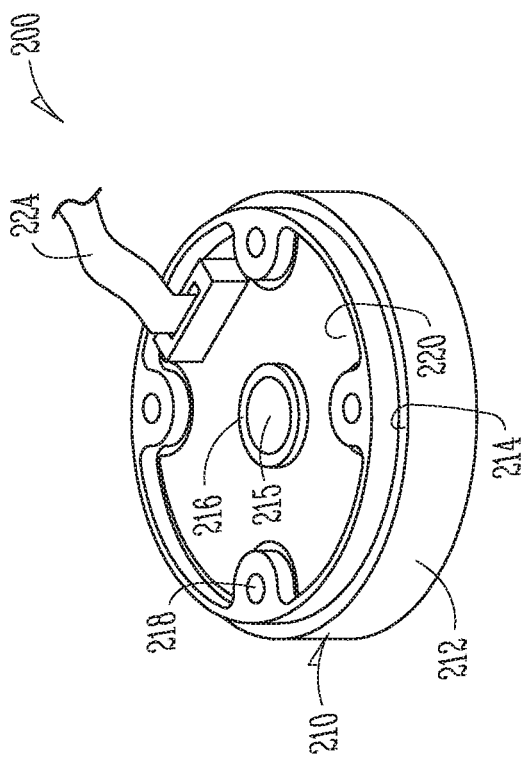

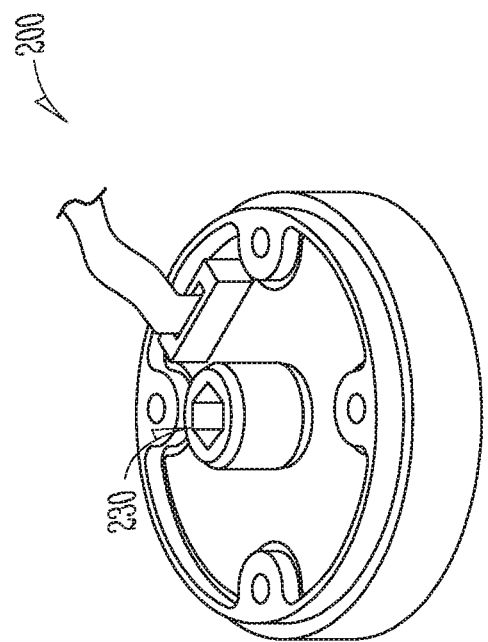
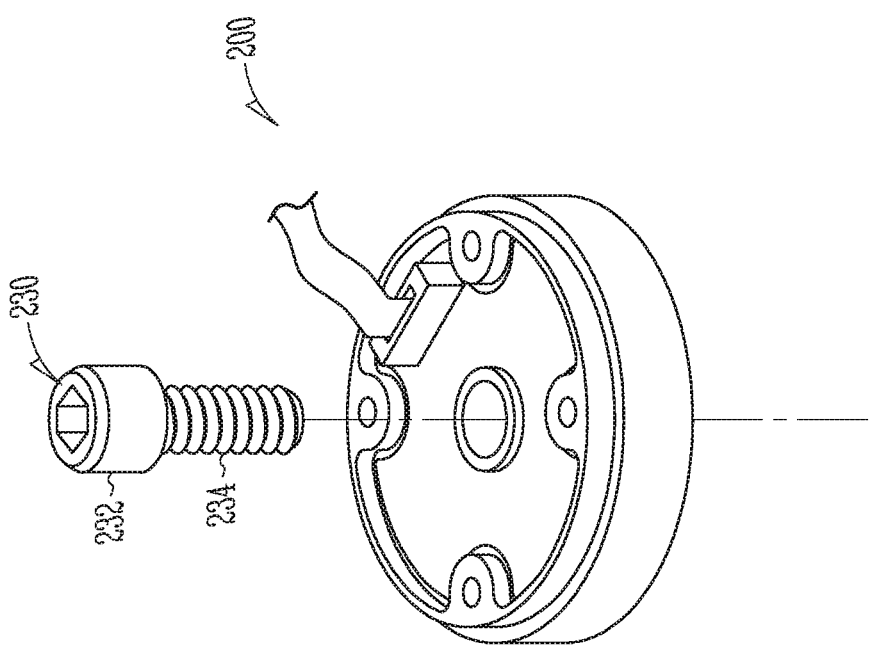

SENSOR MOUNTING ASSEMBLY FOR MACHINE CONDITION MONITORING

TECHNICAL FIELD

This document relates generally to machine condition monitoring, and more particularly to a sensor mounting assembly for attaching a sensor to a machine to detect and diagnose machine fault.

BACKGROUND

Manufacturing and processing facilities and plants usually contain many machines for various applications. These machines generally have complex mechanical components of all sizes and shapes. In some facilities, hundreds or even thousands of machines may exist in connection with various processes being performed to meet the manufacturing and processing requirements.

Many machines, such as compressors, turbines, pumps, motors, and fans, include rotational components. In order to maintain, troubleshoot and operate these machines, it is often important to monitor the machines during operation and detect any potential component defects or operational faults. Rotation speed, or rotations per minute (RPM) readings, can be used to assess operations of some rotational components of a machine. Some problems with the machines that are not readily apparent to the naked eyes or are otherwise difficult or impossible to ascertain can be identified by analyzing the RPM readings. For example, significant deviations of RPM readings from some specified machine specification, or away from past RPM readings, can be indicative of machine anomaly that requires maintenance, repair, or replacement of a machine part.

Accurate characterization of an operating condition of a machine or a machine part is important for detecting a machine fault and generating fault diagnostics. Improper or inaccurate characterization (e.g., RPM readings) can lead to false detection or misdiagnosis of a fault. Conventional machine fault detection generally requires a human operator to perform machine fault testing intermittently, such as during scheduled maintenance. The engineer may use a portable instrument to perform an RPM test, interpret the results, and decide presence or absence of machine faults, and recognizes particular fault types.

OVERVIEW

Sensors have been used to monitor machine health and to detect anomalies. Characteristic features, such as rotational speed (or RPM readings) for rotating machine parts, may be extracted from sensor signals. For example, an RPM sensor, commonly known as a tachometer, can be installed on a machine to measure the rotational speed directly. Installation of such sensors, however, can be difficult because some machine parts to be monitored are not easily accessible. Moreover, the RPM sensors can be costly. Given the large numbers of machines in typical plants, the overall cost for machine operating condition monitoring based on such RPM sensors can be prohibitive. Consequently, direct RPM measurement is often limited to a few critical machines or machine parts.

The present document discusses apparatus and methods for mounting a sensor node to a machine, such as a motor, a gearbox, a bearing, a transmission, or other components. An exemplary sensor mounting assembly includes a base with a substantially centered through-hole, and a fixation member operatively to pass through the through hole and engage the base. The sensor node can include a circuit board with one or more sensors and circuitry to sense information of machine characteristic, such as vibration, energy profiles, magnetic field, temperature, or acoustic information produced by the rotational movement of a machine or a machine part. The circuit board defines a guide hole concentrically aligned with the through hole on the base to allow the fixation member to pass through said holes. The base can be fixed directly to the machine using the fixation member, or via a mounting pad. A computing device, such as a cloud server, may communicate with the sensor nodes, and provide a cloud-based service, including detecting a machine fault or diagnosing a fault type. A user may access the fault detection and diagnostics via a client device, and take actions such as further inspection, services, and repairs to prevent machine or part failure and minimize machine downtime.

Example 1 is a sensor node for monitoring an operating condition of a machine. The senor node comprises a mounting assembly and a circuit board. The mounting assembly may include a base and a fixation member. The base may include a base floor and a raised peripheral edge on the base floor, such as along a perimeter of the base floor, the raised peripheral edge and the base floor defining a base compartment. The fixation member configured to engage the base via a through hole on the base floor and to removably affix the base to the machine. The circuit board can be sized and shaped to fit within the base compartment, the circuit board including circuitry configured to receive information of machine characteristic. The circuit board may have a guide hole concentrically aligned with the through hole on the base floor when the circuit board is located within the base compartment. The fixation member can be configured to pass through the concentrically aligned guide hole on the circuit board and the through hole on the base floor to engage the base.

In Example 2, the subject matter of Example 1 optionally includes the base with the through hole substantially centered on the base floor.

In Example 3, the subject matter of any one or more of Examples 1-2 optionally includes the base floor that may include a raised lip extending above the base floor around a perimeter of the through hole. The raised lip can be sized to couple to the guide hole on the circuit board to guide placement of the circuit board into the base compartment.

In Example 4, the subject matter of Example 3 optionally includes a watertight seal at an interface between the fixation member and the raised lip.

In Example 5, the subject matter of any one or more of Examples 1-4 optionally includes the fixation member that can be configured to be inserted from the base compartment outward to an exterior of the base.

In Example 6, the subject matter of Example 5 optionally includes the fixation member that can include a bolt having a head and a shank. To engage the base, the shank can be configured to pass through the concentrically aligned through hole on the base floor and the guide hole on the circuit board, and to extend beyond the exterior of the base. The bolt head can remain in the base compartment.

In Example 7, the subject matter of Example 6 optionally includes the shank of the bolt that can include a proximal unthreaded grip portion to interface with through hole on the base floor, and a distal threaded portion configured to thread-engage with the machine.

In Example 8, the subject matter of any one or more of Examples 1-7 optionally includes the mounting assembly that can further include a mounting pad detachably attached to an exterior of the base floor using the fixation member.

In Example 9, the subject matter of Example 8 optionally includes the mounting pad that can have a hole substantially centered on the mounting pad, and the fixation member that can be configured to detachably bind the base and the mounting pad via the hole on the base floor and the mounting pad hole concentrically aligned to each other.

In Example 10, the subject matter of Example 9 optionally includes the mounting pad with the threaded mounting pad hole. The fixation member can be configured to thread-engage the threaded mounting pad hole to bind the base and the mounting pad.

In Example 11, the subject matter of any one or more of Examples 9-10 optionally includes the mounting pad that can have a cylindrical body with a first circular face in full contact with the base floor, and a second circular face, opposite to the first circular face, in contact with the machine.

In Example 12, the subject matter of any one or more of Examples 8-11 optionally includes the mounting pad that can include an adhesive or a magnetic mounting means to affix to the machine.

In Example 13, the subject matter of any one or more of Examples 1-12 optionally includes the circuitry that can be coupled to one or more sensors to sense information of machine characteristic including one or more of: an accelerometer configured to sense vibration; a magnetic field sensor configured to sense magnetic field; a temperature sensor configured to sense temperature; or an acoustic sensor configured to sense acoustic information.

In Example 14, the subject matter of any one or more of Examples 1-13 optionally includes a case detachably affixed to the base, the case and the base defining an enclosure to house one or more of: a memory circuit; a communication circuit; or a battery.

Example 15 is a system for monitoring machine operating condition. The system comprises a sensor network including sensor nodes configured to be mounted on respective machine parts, receive information of machine characteristic from the respective machine parts, and provide the received information of machine characteristic to a cloud-based service to assess machine operating condition. The sensor nodes each include: a mounting assembly and a circuit board. The mounting assembly may include (1) a base having a base floor and a raised peripheral edge on the base floor, such as along a perimeter of the base floor, the raised peripheral edge and the base floor defining a base compartment; and (2) a fixation member configured to engage the base via a through hole on the base floor and to removably affix the base to the machine. The circuit board can be sized and shaped to fit within the base compartment. The circuit board includes circuitry configured to receive information of machine characteristic. The circuit board can have a hole concentrically aligned with the through hole on the base floor when the circuit board is located within the base compartment. The fixation member can be configured to pass through the concentrically aligned guide hole on the circuit board and the through hole on the base floor to engage the base.

In Example 16, the subject matter of Example 15 optionally includes a cloud-computing device communicatively coupled to the sensor network. The cloud-computing device can be configured to provide the cloud-based service including one or more of: detecting presence or absence of a machine fault; generating an indicator of time to machine failure; diagnosing a fault type; or generating an alert or a report of a machine fault on a client device.

In Example 17, the subject matter of Example 16 optionally includes the sensor network that can be a hierarchical network including at least one master node communicatively coupled to two or more member nodes. Both the master node and the two or more member nodes can be selected from the sensor nodes. The master node can include a power supply and a communication circuit configured to communicate with the cloud-computing device.

In Example 18, the subject matter of Example 17 optionally includes the master node that can be coupled to the two or more member nodes via a wired connection.

Example 19 is a method of monitoring an operating condition of a machine using a sensor node. The method comprises steps of: providing a sensor node, the sensor node comprises (1) a mounting assembly including a base and a fixation member and (2) a circuit board having a guide hole; positioning the base of the mounting assembly on the machine, the base including a base floor with a substantially centered through hole and a raised peripheral edge on the base floor, the raised peripheral edge and the base floor defining a base compartment for receiving the circuit board, the guide hole on the circuit board and the through hole on the base floor concentrically aligned to each other; inserting the fixation member from the base compartment outward through the concentrically aligned guide hole and the through hole, and extending beyond the exterior of the base; and affixing the base to the machine using the fixation member.

In Example 20, the subject matter of Example 19 optionally includes fitting the guide hole on the circuit board over a raised lip around a perimeter of the through hole, the raised lip extending above the base floor, and disposing the circuit board into the base compartment.

In Example 21, the subject matter of any one or more of Examples 19-20 optionally includes affixing the base to the machine that can include extending a distal threaded portion of the fixation member beyond the exterior of the base, and thread-engaging the machine using distal threaded portion.

In Example 22, the subject matter of any one or more of Examples 19-21 optionally includes adjusting an orientation of the base on the machine by rotating the base around the fixation member.

In Example 23, the subject matter of any one or more of Examples 19-22, optionally includes binding a mounting pad to an exterior of the base floor that can include passing the fixation member through (1) the through hole on the base floor and (2) a substantially centered hole on the mounting pad operatively aligned concentrically to the through hole.

In Example 24, the subject matter of Example 23 optionally includes affixing the base to the machine that can include using adhesive mounting or magnetic mounting on the mounting pad.

In Example 25, the subject matter of any one or more of Examples 19-24 optionally includes sensing information of machine characteristic using the sensor node; generating machine condition analytics using a cloud-based service. The machine condition analytics can include detection of a machine fault or diagnosis of a fault type using information of machine characteristic, and alerting a user of the generated machine condition analytics.

Example 26 is a sensor node for monitoring an operating condition of a machine. The sensor node includes a mounting assembly and a circuit board. The mounting assembly can include a base and a fixation member. The base can have a base floor and a raised peripheral edge on the base floor, such as along a perimeter of the base floor, the raised peripheral edge and the base floor defining a base compartment. The fixation member can be configured to engage the base via a through hole substantially centered on the base floor and to removably affix the base to the machine. The circuit board can be sized and shaped to fit within the base compartment. The circuit board can include circuitry configured to receive information of machine characteristic. The circuit board can have a guide hole concentrically aligned with the through hole on the base floor when the circuit board is located within the base compartment, and the fixation member can be configured to pass through the concentrically aligned guide hole on the circuit board and the through hole on the base floor to engage the base. The base floor of the sensor node can include a raised lip extending above the base floor around a perimeter of the through hole, the raised lip sized to couple to the guide hole on the circuit board to guide placement of the circuit board into the base compartment. The raised lip can interface with the fixation member via a watertight seal.

This Overview is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIGS. 2A-2D illustrate examples of portions of a deployable sensor node with a mounting assembly.

DETAILED DESCRIPTION

Figure 1:
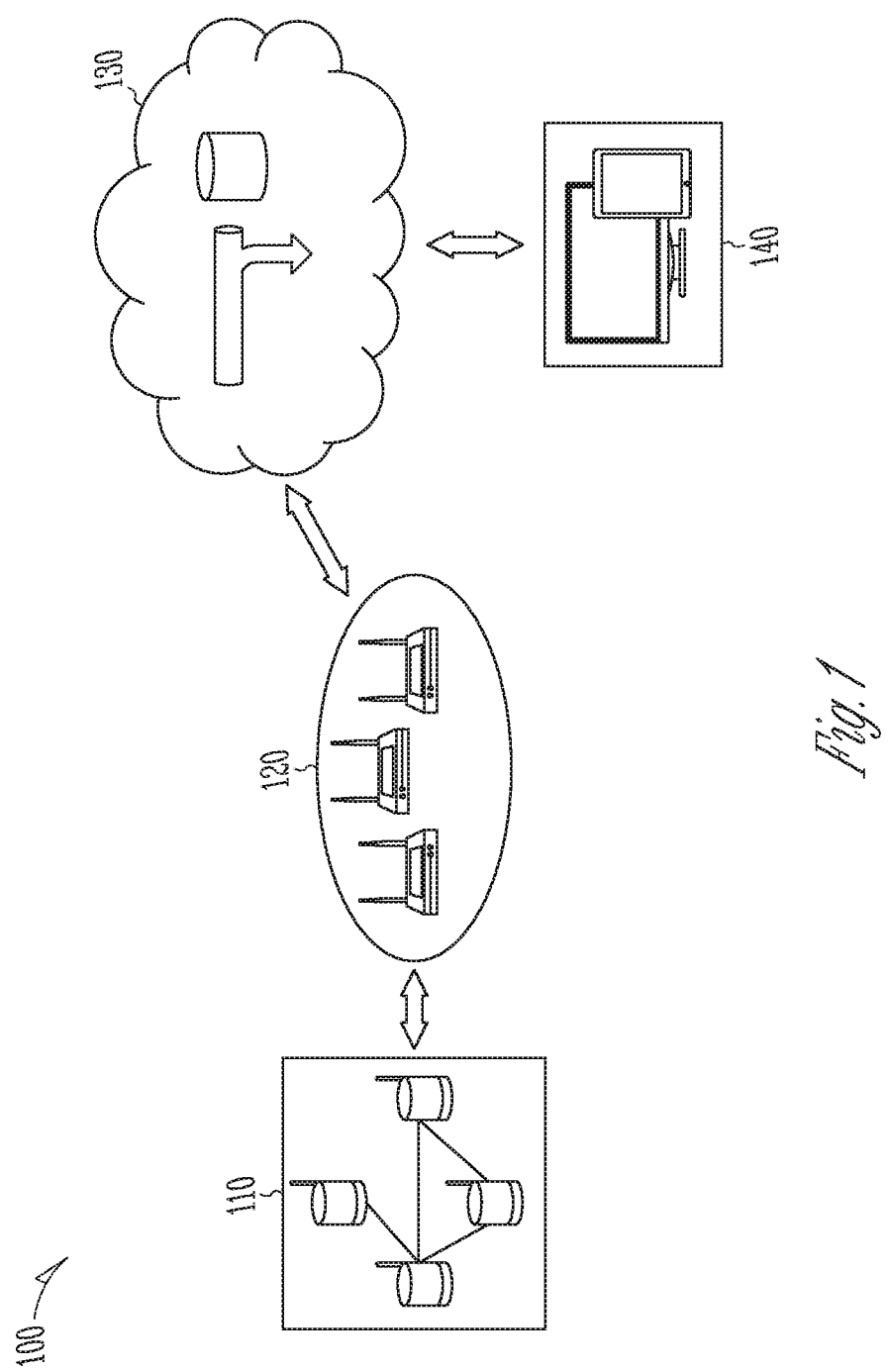
FIG. 1 is a diagram illustrating an exemplary architecture of a machine health monitoring system to detect, isolate, and diagnose machine anomaly.

Machine faults can be detected using an estimate of rotational speed, or RPM reading. In some examples, the RPM reading may be estimated indirectly using information of machine characteristic, such as vibration, energy profiles, magnetic field, temperature, or acoustic information produced by the rotational movement of some machine parts. For example, most machines have a typical vibration level and a frequency spectrum with a characteristic shape when the machine is in a good operating condition. If a machine fault develops, the dynamic processes in the machine may change, so do the forces acting on the machine. This may result in corresponding changes in vibration level and vibration spectrum. For example, excessive vibration levels at certain frequencies may indicate a particular machine fault or operational problem. The defect frequencies are directly related to the machine speed as multiples of RPM. By monitoring the change in the vibration level and spectrum, a trained operator can determine if a machine fault is present, and if so, the type of fault most likely to have been involved.

Indirect RPM estimation typically requires an operator to interpret the vibration spectrum, which may not be suitable for automatic machine fault detection and diagnosis. In addition to the lack of automaticity, conventional machine health monitoring techniques also do not support continuous monitoring when the machine is operating in its normal environment. There is an unmet need for automated, continuous and coordinated machine health monitoring particularly in view of the advances in information technology and new device capabilities.

Performance of machine fault detection, isolation, and diagnosis can be affected by many factors, including reliability of sensor measurements of machine characteristic (e.g., machine vibration). Proper sensing mounting can provide reliable and quality sensor measurements. It may also improve sensor node durability and extend sensor node lifetime. For example, to affix an accelerometer to a machine to sense vibration, different mounting techniques can be used including, for example, stud mounting, adhesive mounting, magnetic mounting, and handheld probe. Magnetic mounting or adhesive mounting are often used for temporary or portable measurements. These techniques are non-invasive to machine surface, and have the advantages of quick and easy sensor node deployment, adjustment, and removal, and convenient and flexible data measurement. However, adhesive or magnetic mounting may lack mechanical stability on the machine, particularly in high-speed rotation or high-intensity vibration environment. The adhesives, or the magnetic base added to the sensor (e.g., accelerometer) may lower the resonant frequency of the sensing system, thus affect the accuracy and limits of the sensor's usable frequency range. As a result, adhesive or magnetic mounting may have a lower frequency response range. Compliant materials (e.g., rubber interface pad) typically used with magnetic or adhesive mounting can further create a mechanical filtering effect by isolating or damping high-frequency transmissibility.

Handheld probes or probe tips are convenient for use, and can be useful when other mounting techniques are impractical. However, it may be prone to inter-user or intra-user measurement inconsistency. Orientation and amount of hand pressure applied create variables that may affect the measurement accuracy. Additionally, similar to adhesive or magnetic mounting, probe tip tends to have a lower resonant frequency of the coupled sensor-mounting system. The less intimate the contact between a sensor node and the machine, the worse the ability to couple and measure high frequency signals.

Invasive mounting techniques, such as a stud mounting, usually involves direct engagement with the machine surface without adhesives or other compliant interfacing materials. Stud mounting generally has high mechanical stability and secured attachment to the machine, high mechanical resonant frequency and broad usable frequency response range, and reliable and accurate sensor measurements. Stud mounting also has advantages of high sensor durability and low cost. However, stud mounting generally requires more time and effort to deploy, adjust, or remove the sensor node than non-invasive mounting means (e.g., adhesive or magnetic mounting). It is also less adaptable to different machine surface conditions.

The present inventors have recognized an unmet need for improved apparatus and techniques of mounting sensors on a machine to monitor machine condition, and detect and diagnose faults. Disclosed herein are apparatus and methods for mounting a sensor node to a machine. An exemplary mounting assembly includes a base with a substantially centered through hole, and a fixation member operatively to pass through the through hole and engage the base. The sensor node includes a circuit board with circuitry to sense information of machine characteristic. The circuit board defines a guide hole concentrically aligned with the through hole on the base to allow the fixation member to pass through said holes. The base can be fixed directly to the machine by the fixation member, or via a mounting pad. A network of sensor nodes may communicate with a cloud-based computing device that can provide a cloud-based service, including detecting a machine fault or diagnosing a fault type.

The sensor node mounting apparatus and method, among other aspects of sensor node and systems as discussed in this document, may improve ease of use of machine condition monitoring sensors, while maintaining high quality and usability for sensor measurements for automated and continuous machine condition monitoring. Compared to conventional mounting techniques, various embodiments of mounting assembly and techniques discussed herein maintain the advantages of stud mounting, including mechanical stability and secure fixation on machine surface under highly vibrating or high rotation speed environment, wide usable sensor frequency response range, and increased sensor durability and longevity. Additionally, the present sensor mounting assembly improves over the conventional stud mounting with structural features that facilitate sensor node installation, adjustment, and removal. For example, an exemplary sensor mounting assembly discussed herein includes a fixation member, such as a crew or a bolt, configured to be inserted outward (i.e., from internal of the sensor node to the external thereof), and the insertion is through a substantially centered through hole on the sensor node base. The fixation member, and the method of using the same, make it easier to engage and disengage from the machine than conventional stud mounting. The internal position of the screw or bolt and outward insertion (i.e., from the internal to the external of the sensor node) allows the head of the screw or the bolt to remain in the sensor node for easy access and adjustment. The fixation member passing through the substantially centered through hole allows for more balanced gripping force that can securely hold the sensor node base to the machine, and at the same time can provide adequate shock resistance in a hostile environment (e.g., high vibration). The center-positioned hole also makes it convenient to re-position or re-align the sensor node with respect to the fixation member to adapt to different machine surface conditions or different sensing applications (e.g., sensing vibration along specific directions). Additionally, conventional stud mounting generally requires blind holes he prepared on the sensor base. Additional depth-limiting structure and/or special caution may be needed to avoid stud being bottom out the sensor base. In contrast, the through-hole base in the present design is easier to make, without the need to additional depth-limiting structures. The mounting assembly and methods that involve a mounting pad, as to be discussed in detail below, is advantageous in that the mounting pad can be pre-installed prior to the sensor base (e.g., by days or longer). The sensor base can be easily removed from, or reinstalled to, the sensor base for repair or machine maintenance.

This document also discusses cloud-based machine fault detection and diagnosis using a network of sensors deployed and mounted using the disclosed mounting assembly and techniques. The cloud-based machine health monitoring can improve the data management, security, and flexibility. Compared to the conventional time-based monitoring wherein machines are tested at particular time intervals, the systems and methods discussed herein utilize condition-based monitoring (CBM) in which the testing and anomaly resolution can occur only upon detection of a problem or a suspected problem. As such, the number of unnecessary machine servicing and testing sessions and shutdowns and their associated costs can be substantially reduced. Costly machine breakdowns can be reduced or even eliminated in some cases due to the ability to detect faults earlier before they can do much damage. The cloud-based machine health monitoring can also help improve on-line and coordinated fault analysis using relatively low-cost data acquisition systems and sensors. Compared to conventional hand-held or other portable measurement and detection solutions, the present systems and methods provide the operators with a means for continuous, remote monitoring of machine condition when the machine is operating in its normal environment. The on-line and coordinated fault analysis may also help increase load on the machine for increased throughput without increasing the likelihood of machine fault.

An exemplary cloud computing architecture as discussed in this document may provide cloud services of data storage and fault analytics including fault detection and diagnosis, while sensor nodes perform data collection, pre-processing, and feature extraction. The cloud-based fault analysis and data management may reduce an operator's workload of onsite machine monitoring and testing, and allows the operator to focus on situations requiring immediate attention. In contrast to conventional local data storage and computing, with cloud computing, there is virtually no need for a user or a facility to maintain their own physical servers, while having the capability to access all required information and computing resources in the cloud via an Internet connection. The user may have vast scalability by using cloud servers for storage, and use only the storage space they require. As discussed in this document, a user can use a client device to access machine analytics, among other information produced and/or stored in the cloud, remotely from anywhere or on-the-move provided there is Internet access. Additionally, multiple users of the cloud service can work on the same piece of information at the same time from their respective clients securely connected to the cloud (e.g., PCs or mobile devices), thus enabling easier collaboration.

FIG. 1 is a diagram illustrating an exemplary architecture of a machine health monitoring system 100 that can be configured to detect, isolate, and diagnose machine anomaly. The anomaly may be associated with various machine components, such motors, gears, bearings, transmission, or other components. The system 100 may include one or more of a network of edge nodes 110, gateways 120, a computing device 130 configured to provide a cloud-based service, and a user interface 140.

The edge nodes 110 may be deployed on machines or machine parts, and configured to acquire information of machine characteristic such as vibration, energy profiles, magnetic field, temperature, or acoustic information produced by the rotational movement of machine components. The edge nodes 110 may be programmed to monitor machine characteristic continuously when the machine operates in its normal environment (e.g., a normal operating condition, as opposed to a testing mode distinct from the normal operating condition). The edge nodes 110 may be mounted on a machine or a machine part using treaded mounting, or a non-invasive means that does not cause permanent alteration to the part of the machine in contact with the edge node, such as magnet mounting or adhesive mounting. Examples of edge node mounting assembly and techniques of affixing the edge node on a machine are discussed below, such as with reference to FIGS. 2-5.

The edge nodes 110 may each include, or be coupled to, one or more sensors configured to sense information of machine characteristic. In an example, an edge node can include an accelerometer that can provide continuous monitoring of the machine condition. In an example, the accelerometer may be a high-bandwidth, single-axis or multi-axis (e.g., two- or three-axis) accelerometer capable of sensing machine vibration in high fidelity. The edge nodes 110 may be battery-powered, which provide long lifetime of operation and low maintenance cost. In an example, the battery can be a re-chargeable battery. In an example, the edge nodes 110 may include an energy-harvesting module to capture energy from external sources (e.g., machine rotations or other kinetic energy), convert and store the energy to operate the edge nodes 110. The edge nodes 110 may process the information of machine characteristic (e.g., vibration information such as sensed by an accelerometer), and generate machine operational parameters. Examples of the machine operational parameters may include one or more of rotating speed estimate (e.g., RPM), statistical or physical features (e.g., temporal or spectral features), summary statistics, machine health indicators, and diagnostic features indicative of various types of faults.

Although the discussion of fault detection and fault diagnostics in the present document focuses on machine vibration information, this is meant only by way of example and not limitation. It is within the contemplation of the inventors and within the scope of this document, that the systems, devices, and methods discussed herein for machine health monitoring and diagnostics may alternatively or additionally be carried out using other machine characteristics, such as one or more of magnetic field, temperature, or acoustic information, produced by the rotational movement of machine components. In some examples, in addition to the vibration or other machine characteristics, the edge nodes may include sensor modalities configured to sense one or more physical parameters in connection with the operation of a machine or machine part, and/or environmental parameters. Examples of such parameters may include position, speed, acceleration, or oilier motion descriptors; electrical parameters such as voltage, current, and impedance; stress, strain, and shock associated with a machine or a part thereof; among others.

In some examples, the edge nodes 110 may additionally generate indicators of operational state, such as an ON/OFF state, of a machine or a machine part. The edge nodes 110 may detect the ON/OFF state of a machine or a machine part using the information of machine characteristic, such as vibration, energy profiles, magnetic field, temperature, or acoustic information of one or more machine parts. In an example, the detection of ON/OFF state may involve an ON/OFF model produced by the cloud 130. If the machined or machine part is determined to be in an "ON" state, then the edge node associated with that machine or machine part may perform feature extraction, RPM estimates, among other node-level analysis using the sensed information of machine characteristic (e.g., vibration information).

The edge nodes 110 may have egress, via a wireless communication network, to the gateways 120 and cloud 130. As illustrated in FIG. 1, the edge nodes 110 may be inter-communicated to form a wireless sensor network, such as a Mesh network. The edge nodes 110 may include self-forming multi-hop mesh of nodes, known as "Motes", which connect directly and dynamically to other nodes and cooperate with one another to efficiently collect and route data from/to clients. Such a mesh network can dynamically self-organize and self-configure, which can reduce installation overhead. A network manager can monitor and manage network performance and security, and exchanges data with a host application. Once the edge nodes have joined the mesh network, they can maintain synchronization through time corrections. In an example, the sensor network may include approximately 10-20 edge notes. The number of edge nodes may be updated dynamically, such as when an edge node is activated or deactivated for sensing information of machine characteristic. In some examples, the edge nodes may be inter-communicated using radio-frequency telemetry or a Bluetooth wireless link.

The gateways 120 may include computers and/or computer programs configured to perform specific tasks, such as edge node connectivity, data aggregation and integration, over-the-air (OTA) updates of new data, software, or firmware to the edge nodes or other mobile devices, identity recognition, security, data buffering, alerting, gateway analytics, monitoring service connectivity, SOS, among others. In an example, the gateways 120 may have a policy that controls what individual edge nodes can send data to the cloud 130. The gateways 120 can be updated with access policies or whitelists.

The gateways 120 may support one or more data communication protocols to control and monitor data flow from the edge nodes 110 to the cloud 130, such as an Internet protocol via Ethernet or a wireless network (e.g., WiFi, or cellular network). In an example, communication between the gateways 120 and the cloud 130 may follow a Message Queuing Telemetry Transport (MQTT) protocol. The MQTT protocol has lightweight overhead and increased seal ability, and can significantly increase the amount of data being monitored or controlled. It therefore can be well suited for connections with remote locations where a small code footprint is required, or where the network bandwidth is limited. In some examples, the gateways 120 can be independent from an existing IT network to improve information security.

As illustrated in FIG. 1, the gateways 120 may include multiple devices, such as multiple routers, that form an asset group. Each router can post data on behalf of an edge node. When an edge node is activated, it can be added to the sensor network. Conversely, an edge node can be removed from the network when it is deactivated.

The cloud 130 may provide data storage, computing services such as machine fault analytics, and provisioning of customer services, among others. The cloud 130 can be updated with access policies or whitelists. The cloud 130 may have a scalable infrastructure that supports the deployed services for sensor data storage and computation. In an example, the cloud 130 may be a part of a cloud platform configured to dynamically assign the physical and virtual resources to the machine health monitoring system 100 according to the system demand, such as number of edge nodes 110, amount of sensor data provided to the cloud, or quality-of-service (QoS) requirements. In some examples, the cloud 130 can be an on-premise cloud.

Data and computing services in the cloud 130 may be accessed such as via Internet. The computing services may include analyzing the statistical or physical features produced by the edge nodes 110, detecting machine anomaly, diagnosing a fault type associated with a machine or a machine part, among other fault analytics services. In some examples, at least a portion of said computing services may be distributed between the cloud 130 and the edge nodes 110. Because the data volume of the extracted features is generally less than the raw sensor data, cloud computing using the extracted features may help conserve bandwidth, save storage space, and therefore achieve cost saving.

The anomaly detection refers to services of detecting existence of machine fault. In an example, the machine fault can be detected using RPM readings, such as derived from the information of machine characteristic and provided by the edge nodes 110. A machine fault is detected if the RPM reading deviates from a pre-determined normal RPM value exceeding a specific margin, or falls outside a value range. In another example, the machine fault can be detected using spectral features at characteristic frequencies, such as using the Fast Fourier Transform (FFT). Examples of the FFT features may include magnitude, phase, harmonics, sidebands, beat frequency, bearing fault frequency and so on. Presence of spectral contents different from pre-determined normal spectra, or in other distinct frequencies, may be indicative of machine faults.

Additionally or alternatively, the machine fault can be detected using statistical methods, such as generating a statistical distribution of a temporal or spectral feature. The statistical distribution may involve a probability density function (PDF) of a feature, which may follow a known statistical distribution, such as a Gaussian distribution (also known as normal distribution). A machine fault can be detected using a Gaussian detector. For example, if the PDF of the extracted feature deviates from the Gaussian distribution by a specified margin, a machine fault is deemed to be present. In some examples, statistical distributions (e.g., PDFs) of multiple physical or statistical features may be combined to form a composite metric, such as a combination of deviations of the PDFs of the multiple features from their respective Gaussian distributions. A machine fault can be detected if the composite metric satisfies a specific condition, such as exceeding a threshold.

In another example, the machine fault can be detected using time-frequency analysis, such as by detecting harmonic contents in a time-frequency distribution of the sensor data collected from the machine or machine part. Sensor signals, such as vibration, magnetic, temperature, or acoustic signals produced by a rotating machine, and features derived therefrom (e.g., speed or RPM), are generally time varying in nature, such that the frequency contents therein may vary over time. Examples of the time-frequency analysis methods may include a short-term Fourier transform, Gabor transform, Gabor spectrogram, among other linear or quadratic time-frequency transform methods. Patterns of frequency changes over time may be determined from the time-frequency presentation of one or more features, and machine fault can be detected using such patterns of frequency changes.

In addition to or in lieu of the foregoing machine fault detection methods, other anomaly detection algorithms may include, by way of example and not limitation, wavelet transform, Wigner-Ville distribution, cepstrum, bispectrum, correlation method, high-resolution spectral analysis, feature morphological analysis, among others. In some examples, the anomaly detection may involve trending over time a statistical or physical feature, a health indicator, or a diagnostic feature. A characteristic change in the trend, such as a sharp increase (e.g., a slope of the trend exceeding a threshold value), may indicate occurrence of a machine fault. In some examples, changes in the trend of a feature or health indicator may be used to generate prognostics that predict a likelihood of future machine fault.

The computing services in the cloud 130 may include generating fault diagnostics such as fault isolation, which includes identifying the source of the detected fault as being a specific machine, a subsystem, or a machine component. The fault diagnostics may include classification of fault types, such as bearing fault, shaft fault (different speed), mounting error, gear box fault (losing teeth). In some examples, one or more fault templates may be generated and stored in a storage module. Each fault template contains signatures of a corresponding fault type. In an example, the fault template may include a statistical distribution template representing statistical distribution of sensor data or of the features extracted therefrom. When an anomaly is detected, the statistical distribution of the data associated with the detected anomaly may be compared to the statistical distribution templates, and a particular fault type is recognized if the statistical distribution of the data matches the template corresponding to the particular fault type, according to a specific matching criterion (e.g., a matching score exceeding a threshold). In an example, the threshold can be updated using a learning algorithm. The computing services may additionally include machine prognostics, such as an indicator of estimated remaining useful lifetime of a machine component before a machine failure can happen, based on past and future operational profiles, and frequency, severity, and type of the faults in connection with said machine component.

The computing services in the cloud 130 include on-going adaption for improved uptime of the machine being monitored. The machine health monitoring system 100 may use the analytics generated and stored in the cloud 130 to adjust the behavior of one or more of the edge nodes 110. For example, if a machine fault is detected, then the edge node associated with the faulty machine may be adjusted, automatically or with user intervention, such as to acquire additional data at a higher sampling rate or generate additional features to confirm the detected fault.

The user interface 140 may be associated with one or more locally configured clients or remote clients securely connected to the cloud 130 over Internet connection (e.g., Ethernet, or wireless connection such as WiFi or a cellular network). Data communication between the clients and the cloud 130 may follow Transmission Control Protocol/Internet Protocol (TCP/IP), Wi-Fi Protected Access security protocol, 3G or 4G cellular network protocols, Long-Term Evolution (LTE), among other network protocols. As may be appreciated by one skilled in the art, other network topologies and arrangements are possible. Examples of the clients may include PCs, tablets, mobile phones or other mobile devices, among others.

A user may use one of more of said clients to access the cloud 130, such as via the Hypertext Transfer Protocol (HTTP) or an encrypted communication protocol (e.g., Hypertext Transfer Protocol for secure communication (HTTPS)). In an example, a user may query a database of the cloud 130, upon necessary user authentication (e.g., account ID, password, bearer token etc.), for information such as fault diagnostics or prognostics, or system operational status. Software programs or mobile applications ("apps") may present the fault analytics to a user, such as to display on a screen of the user interface. Health information about multiple machines or machine parts in a plant, including fault analytics (e.g., fault detection and classification), may be presented in a form of an interactive dashboard. The information may be presented in a table, a chart, a diagram, or various textual, tabular, or graphical formats, Hard copies of such information may be printed. The information presented to the user may also include edge node deployment, data acquisition and analysis, system connectivity and operating status, etc.

The client devices may generate an alert notification to alert a user of the detected incipient fault, the diagnosed fault type, and/or how long before the fault may cause machine failure. The alert notification may be sent via email, text or "Instant" messaging such as short message service (SMS), Web page update, phone or pager call, among others. In some examples, alert notification is triggered only when a specific alert condition is satisfied. Upon alert notification, the user may view that status, interpret the results, and take actions such as performing further test, make necessary repairs or other preventive or corrective actions.

Portions of the machine health monitoring system 100 may be implemented using hardware, software, firmware, or combinations thereof. In an example, at least a portion of the machine health monitoring system 100 may be implemented using an application-specific circuit that may be constructed or configured to perform one or more particular functions, or may be implemented using a general-purpose circuit that may be programmed or otherwise configured to perform one or more particular functions. Such a general-purpose circuit may include a microprocessor or a portion thereof, a microcontroller or a portion thereof, or a programmable logic circuit, a memory circuit, a network interface, and various components for interconnecting these components. For example, a "comparator" may include, among other things, an electronic circuit comparator that may be constructed to perform the specific function of a comparison between two signals or the comparator may be implemented as a portion of a general-purpose circuit that may be driven by a code instructing a portion of the general-purpose circuit to perform a comparison between the two signals.

FIGS. 2A-2D illustrate examples of portions of a deployable sensor node 200 with a mounting assembly to affix the sensor node on a machine to sense machine characteristic, such as one of the edge nodes 110 as discussed above in FIG. 1. The information of machine characteristic may include one or more of vibration, energy profiles, magnetic field, temperature, or acoustic information produced by the rotational movement of machine components. The sensor node 200 can include a base 210, a circuit board 220, and a fixation member 230 configured to removably affix the base 210 to the machine. The base 210 and the fixation member 230 are parts of a sensor mounting assembly.

FIGS. 2A-2B are respectively a top view and a bottom view of the base 210, and FIGS. 2C-2D show the fixation member 230 engaging with the base 210. The base 210 may be made of metal (e.g., aluminum or stainless steel) or polymers. The base 210 can have a substantially circular shape, although other shapes (e.g., square or oval) are possible. The base 210 comprises a substantially flat base floor 212 and a raised peripheral edge 214 along the perimeter of the base floor 212. The base floor 212 can be affixed directly to a machine surface, such as using the fixation member 230. Alternatively, an intermediate interfacing member can be removably attached to an exterior of the bottom of the base 210. The intermediate interfacing member has a machine-contacting face, opposite to the base-contacting face, that interfaces with the machine. An example of the intermediate interfacing member is a mounting pad, as to be discussed below with reference to FIGS. 4A-4B.

The raised peripheral edge 214 and the base floor 212 define an internal base compartment of the sensor node 200. In some examples, the raised peripheral edge 214 may also be configured to support and engage a housing of the sensor node 200, which will be discussed in the following with reference to FIG. 6.

The circuit board 220 can be sized and shaped to fit within the base compartment defined by the base floor 212 and the raised peripheral edges 214. The circuit board 220 can include, or otherwise couple to, one or more sensors and circuitry to receive and process information of machine characteristic. In an example, the sensors on the circuit board 220 can include one or more accelerometers configured to sense machine vibration. The accelerometers may be one-, two-, or three-axis accelerometers. The accelerometer may have a high-bandwidth to sense high-frequency vibration information reliably. In another example, the sensors on the circuit board 220 can include one or more magnetic-field sensors configured to sense a magnetic field produced by machine motion (e.g., vibration) during normal operation. In another example, the sensors on the circuit board 220 can include one or more temperature sensors configured to sense temperature or a change in temperature of the machine being monitored during normal operation. In yet another example, the sensors on the circuit board 220 can include one or more acoustic sensors configured to sense acoustic information produced by the rotational movement of machine components. The acoustic sensors can be sensors based on silicon, optical-waveguide, or polymer technologies.

The circuitry on the circuit board 220 can include components, sub-circuits, or other functional modules distributed on the circuit board, examples of which are discussed below with references to FIGS. 3A-3B. The circuitry can include a data acquisition circuit, and a signal conditioning circuit to pre-process the information of machine characteristic, such as amplification, filtering, transformation, among others. In an example, the circuitry can include data acquisition circuit with adjustable data sampling parameters, such as sampling rate or duty cycle. In an example, the circuit board 220 can include a motion sensor configured to qualify the sensor data sampling provided by the one or more sensors, such as an accelerometer. The motion sensor may gate data acquisition, such as determining an ON or an OFF state of a machine, and trigger the accelerometers or other sensors to acquire data when the machine is in an ON state, consequently conserve battery life. The motion sensor can be an accelerometer sensor with different performance characteristics than the accelerometers configured to sense machine vibration, or have different sensor modality than the accelerometers.

The circuitry on the circuit board 220 may generate machine operational parameters including, for example, rotating speed estimate (e.g., RPM), statistical or physical features (e.g., temporal or spectral features), summary statistics, machine health indicators, and diagnostic features indicative of various types of faults. Said features or indicators may be extracted or derived from time-domain analysis, frequency-domain or spectral analysis (e.g., via Fast Fourier Transform (FFT)), joint time-frequency analysis, or analysis in other transformed domain, of the acquired sensor information. The statistical features and indicators may include first order, second order, or higher order statistics of the accelerometer data. Examples of statistical features and indicators may include, by way of example and not limitation, absolute max value, average max value, peak-to-peak value, variance, standard deviation, skewness, kurtosis, RMS value, crest factor, clearance factor, impulse factor, shape factor, delta RMS, energy ratio, sideband energy, sideband index, sideband level factor, among others. In some examples, the statistical features or indictors may include one or more composite features computed using two or more of the statistical features of indicators. The sensor data and the machine operational parameters acquired or generated by the circuitry on the circuit board 220 may be transmitted to another device via a communication pathway, such as a wired connection 224. Examples of networking and data communication among multiple sensor nodes are discussed below, such as with reference to FIG. 7.

The base 210 can have a through hole 215 on the base floor 212. The fixation member 230 can be configured to engage the base 210 via the through hole 215, and removably affix the base 210 to the machine. In an example, the fixation member 230 can include a bolt having a head 232 and a shank 234. FIGS. 2C and 2D respectively illustrate engagement of fixation member 230 with the base 210 before and after the fixation member 230 being inserted into the through hole 215. The fixation member 230 can be inserted outward (i.e., from the internal base compartment to the exterior of the base 210). Compared to conventional stud mounting, a screw or a bolt can be easier to engage and disengage from the machine. The internal position of the screw or bolt and outward insertion allows the bolt head 232 to remain inside the sensor node for easy access and adjustment. The through hole 215 is easier to make than the conventional stud mounting which generally requires blind holes be prepared on the sensor base.

Figure 4B:
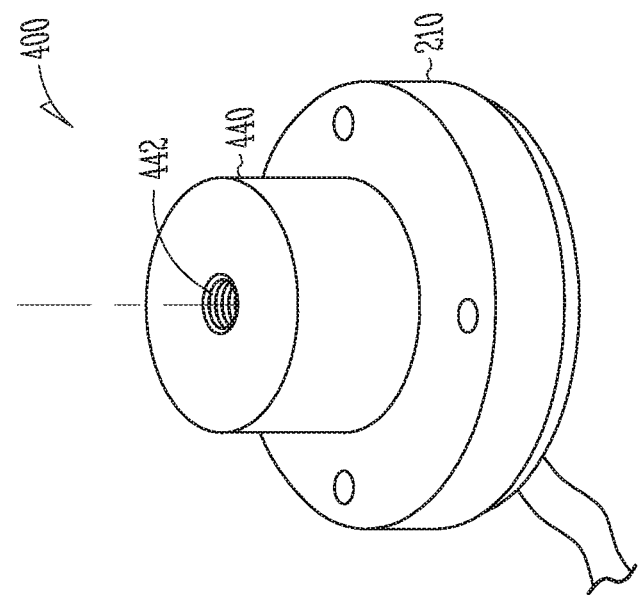
FIG. 4A-4B illustrate examples of portions of a sensor node mounting assembly with a mounting pad.
Figure 4A:
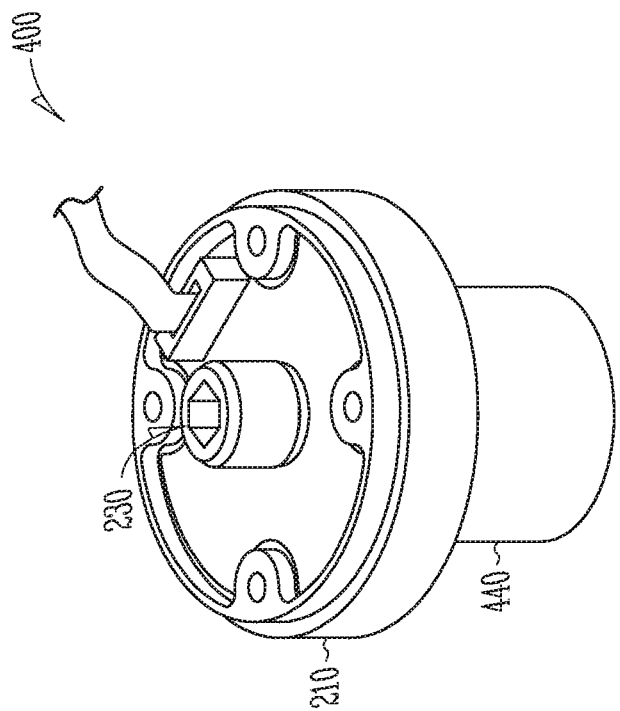

The bolt shank 234 is sized and configured to pass through the through hole and extend to the exterior of the base 210. In an example, the bolt shank 234 has a proximal unthreaded grip portion and a distal threaded portion. When the bolt 230 engages the base floor, the bolt head 232 remains in the internal of the sensor node, the grip portion is to interface with the through hole 215, and the distal threaded portion can extend beyond the bottom face of base 210. The distal threaded portion can directly thread-engage with the machine. Alternatively, the distal threaded portion can thread-engage with an intermediate interfacing member, such as a mounting pad as illustrated in FIGS. 4A-4B, that can be mounted on the machine surface. In an example, the bolt head 232 is a socket head (e.g., an Allen key socket head as shown in FIGS. 2C-2D) to facilitate insertion of the bolt shank 234 into the through hole 215 from the interior of the sensor node. It is to be understood that the bolt is illustrated and discussed herein by way of example but not limitation. Other fasteners, such as screws or binding posts, may also be used.

In some examples, the through hole 215 can be substantially centered on the base floor 212. The substantially centered through hole can provide more balanced gripping force to bind the base to the machine surface as well as adequate shock resistance in a hostile environment. The substantially centered through hole can also make it convenient to adjust the orientation of the base 210 (e.g., with respect to the fixation member 230) to better conform to the machine surface topology, or to align the sensor node to a desired direction to sense a signal. For example, in the event of sensing vibration, the base 210 can be rotated around the fixation member 230 until an axis (e.g., x-axis) of an accelerometer inside the sensor node is in line with the axial direction of a shaft of a motor, such that the sensor can more accurately sense vibration in a particular direction. The center-positioned hole thus makes it convenient to re-position or re-orientate the base (and thus the sensor node) to adapt to different machine surface conditions and/or to improve sensor data quality in a particular direction.

The base floor 212 can include a raised lip 216 around a perimeter of the through hole 215 on the base floor. The raised lip 216 extends above the base floor, and can guide disposition of the circuit board 220 into the base compartment. The circuit board 220 can have a guide hole sized and shaped to allow the fixation member 230, such as the bolt shank 234, to pass through. When the circuit board 220 is located within the base compartment, the through hole 215 on the base floor and the guide hole on the circuit board can be concentrically aligned. In an example, the outer diameter of the raised lip 216 is smaller than the diameter of the guide hole, such that the raised lip 216 can fit through the circuit board 220. In an example, the guide hole can be substantially centered on the circuit board 220 to provide adequate balance and stability when the fixation member 230 engages the base floor 212 and the circuit board 220. The substantially centered guide hole also makes it convenient to adjust the position of the circuit board 220 within the base compartment, such as by rotating the circuit board 220 around the raised lip 216.

The raised lip 216 has an inner diameter substantially equal to the through hole on the base floor to accommodate the fixation member 230 to engage the base 210 and the circuit board 220. In an example, the interior of the raised lip or the through hole 215 can be thread-coupled to the fixation member 230 to provide strong binding force holding the base to the machine. Alternatively, the interior of the through hole 215 and the raised lip are unthreaded. This allows for easy push-through of the fixation member 230, and also facilitates adjustment of the base 210 position or orientation with respect to the fixation member 230.

The raised lip 216 can function as a depth-limiting shoulder to prevent the fixation member (e.g., bolt head 232) from directly contacting and compressing against the circuit board 220. This can provide several advantages. The circuit board 220 can be made of fiberglass. Direct contact and compression may crush or otherwise damage the circuit board, particularly when the sensor node operates in a hostile environment such as high-frequency vibration and/or uneven machine surface. Special compression-resistant material may increase circuit board manufacturing cost. The raised lip 216 can protect the circuit board from being crushed or damaged, while avoiding costly circuit board made of compression-resistant material. Additionally, direct contact with the fixation member may take space on the circuit board, because the contacting area is unfit for electrical components placement and circuit layout. The raised lip 216 avoids direct contact with the fixation member, thus can help save circuit board space for the electrical components and circuitry. With more efficient use of circuit board space, a smaller circuit board can be used. Accordingly, design and manufacturing cost can be reduced by.

In some examples, the fixation member 230 is configured to engage the base 210 and the circuit board 220 further using a watertight seal (not shown) between the fixation member 230 and the raised lip 216. An example of the watertight seal includes a recessed O-ring. The watertight seal can help prevent water or moisture from seeping into the interior of the edge node 210 and thus damaging the circuit board 220 and other electrical or mechanical parts inside the edge nodes 210. In some examples, additional fasteners may be used to secure the base 210 to the exterior housing 660, such as by a set of screws passing through corner screw holes 218. In some examples, screws and corner holes 218 may be used to affix the circuit board 220 to the base floor 210.

Figure 3C:
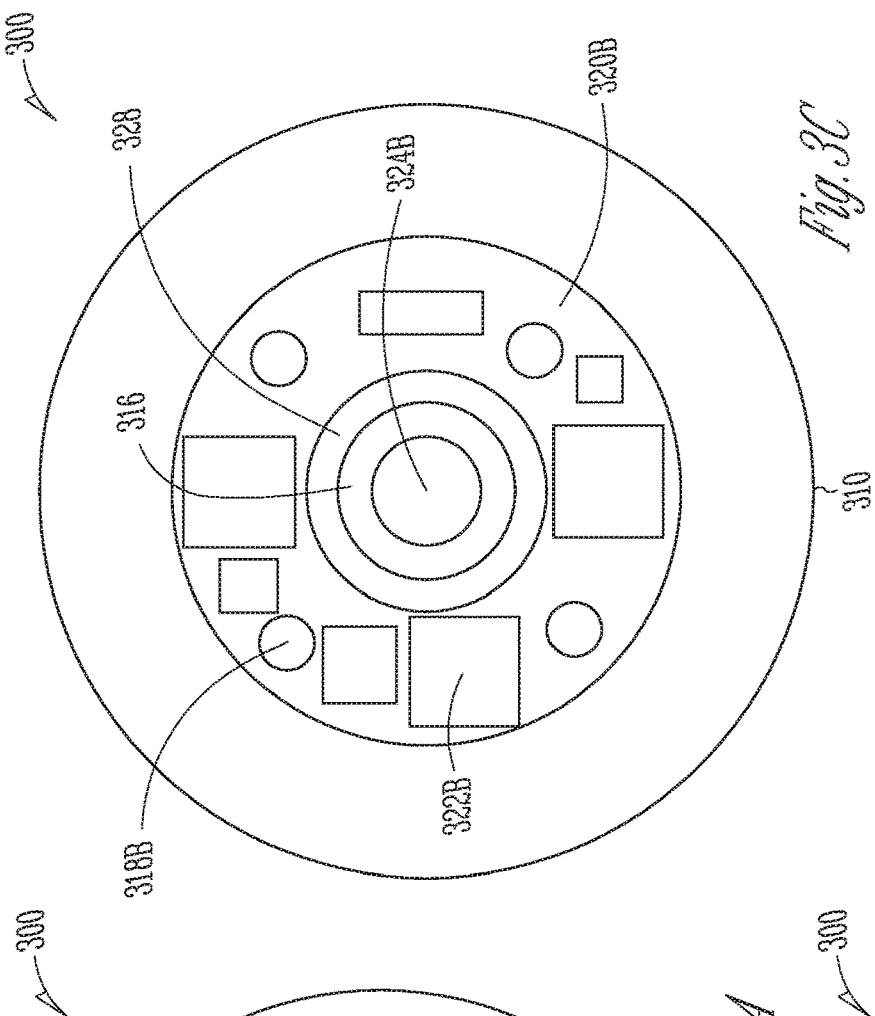
FIGS. 3A-3C are diagrams illustrating examples of portions of a sensor node mounting assembly for affixing a sensor node on a machine.
Figure 3A:
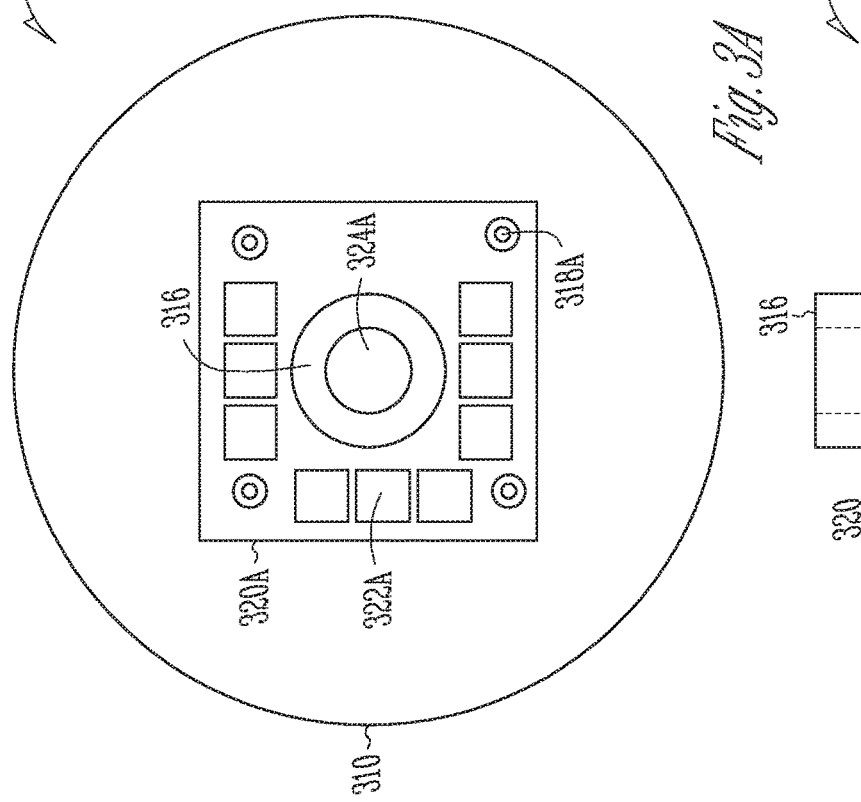
Figure 3B:
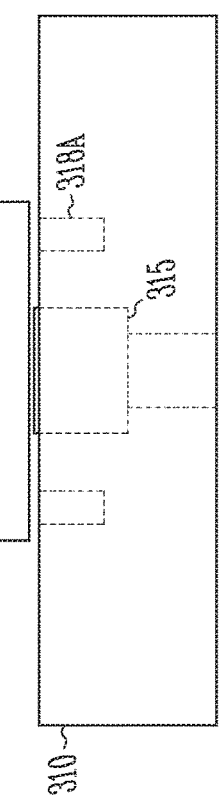

FIGS. 3A-3C are diagrams illustrating examples of portions of a sensor node mounting assembly 300 for affixing a sensor node on a machine. The sensor node, which is an embodiment of the sensor node 200 in FIGS. 2A-2B, includes a base 312 and a circuit board sized and shaped to fit within the sensor node against a base 310. The base 310 is an embodiment of the base 210, and has a substantially centered through hole 315 sized and shaped to receive a fixation member (not shown), such as the fixation member 230 shown in FIGS. 2C-2D. The base 310 includes a circular-shaped raised lip 316 around a perimeter of the through hole 315 extending above the base floor.

FIGS. 3A-3B illustrates respectively a top view and a side view of a square-shaped or rectangular circuit board 320A with a number of components 322A distributed thereon. The circuit board 320A, which is an embodiment of the circuit board 220, has a substantially centered guide hole 324A. The guide hole 324A has a diameter greater than the outer diameter of the raised lip 316, such that the raised lip 316 can fit through the guide hole 324A. The raised lip 316 can serve as a post to guide disposition of the circuit board 320A. The hole 324A on the circuit board can be concentrically aligned to a through hole 315 on the node base 310, such that the fixation member can engage the circuit board 320A and the base 310 through the guide hole 324A and the through hole 315 on the base.

FIG. 3C illustrates a top view of a substantially circular circuit board 320B with a number of components 322B distributed thereon. Similar to the circuit board 320A, the circuit board 320B has a guide hole 324B concentrically aligned with the through hole 315 on the base 310 to allow the fixation member to pass through and thereby engaging the circuit board 320A and the base 310. The guide hole 324B can also be sized to allow the raised lip 316 to pass through, and thereby using the raised lip 316 to guide disposition of the circuit board 320B. The circuit board 320B may include a designated keep-out area 328 around the guide hole 324B that is likely to be interfered by the fixation member. The electrical components on the circuit board 320B may be away from the keep-out area 328.

Similar to the fixation member 230, the fixation member can be inserted from the internal base compartment of the sensor node outwards through the through hole 315. The fixation member can have a distal threaded portion extending beyond the bottom of the base 310 and thread-engages directly onto a machine surface, thereby affixing the base 310 and the circuit board. Alternatively, the distal threaded portion can thread-engage with an intermediate interfacing member, such as a mounting pad as illustrated in FIGS. 4A-4B, which can be invasively or non-invasively mounted on the machine surface. In some examples, the circle board 320A or 320B may respectively be secured on the base 310 using screws that pass through corner holes 318A or 318B.

FIG. 4A-4B illustrate examples of portions of a sensor node mounting assembly 400 with a mounting pad 440 detachably attached to an exterior of the base 210, such as at the bottom of the base 210. The mounting pad 440 provides an alternative to direct contact between the base 210 and the machine surface. In the event of mounting a sensor node on a rough machine surface, the mounting pad 440 can provide a smooth and flat platform to support the sensor node, and can improve sensor frequency response. The mounting pad 440 may also serve as a landmark for subsequent measurements at the same machine location, such as for purposes of data trending in machine condition monitoring.

The mounting pad 440 has a first base-contacting face to interface with the bottom of the base 210, and a second machine-contacting face, opposite to the base-contacting face, to interface with the machine. In an example as illustrated in FIGS. 4A-4B, both the mounting pad 440 and the base 210 have a cylindrical shape. The cylindrical-shaped mounting pads 440 have a circular base-contacting face and a circular machine-contacting face. The circular base-contacting face has a diameter smaller than that of the circular bottom of the base 210. As such, the base-contacting face can be completely within, and in full contact with, the exterior of the base 210. The full contact can improve stability when the base 210 is secured on a machine. In an example, the base-contacting face has a diameter of approximately one inch, and the base 210 has a diameter of approximately 1.75-2 inches.

The mounting pad has a hole 442 coaxially aligned with the through hole 215 on the base floor 212. A fixation member, such as a bolt as shown in FIGS. 2C-2D, can be detachably bind the base and the mounting pad through the mounting pad hole 442 and the through hole 215 on the node base 210. The mounting pad hole 442 can be threaded. The fixation member can be inserted from the internal base compartment outward to the exterior of the sensor node, passing through the concentrically aligned guide hole on the circuit hoard, the through hole 215 on the base 210, and the mounting pad hole 442. The fixation member can include at least a distal threaded portion to thread-engage the mounting pad hole 442.

The mounting pad 440 can be affixed to the machine surface using adhesive (e.g., epoxy, glues, or Petro wax) or magnetic mounting, or can be welded to the machine. Alternatively, the mounting pad 440 can be invasively affixed to the machine. In an example, the mounting pad hole 442 is a through hole along the axial direction of the mounting pad 440. The distal threaded portion of the fixation member is long enough to extend beyond the machine-contacting face when fully engaging the mounting pad 440. The extended threaded portion can be screwed into the machine to secure the base 210 and the mounting pad 440 on the machine.

Figure 5A:
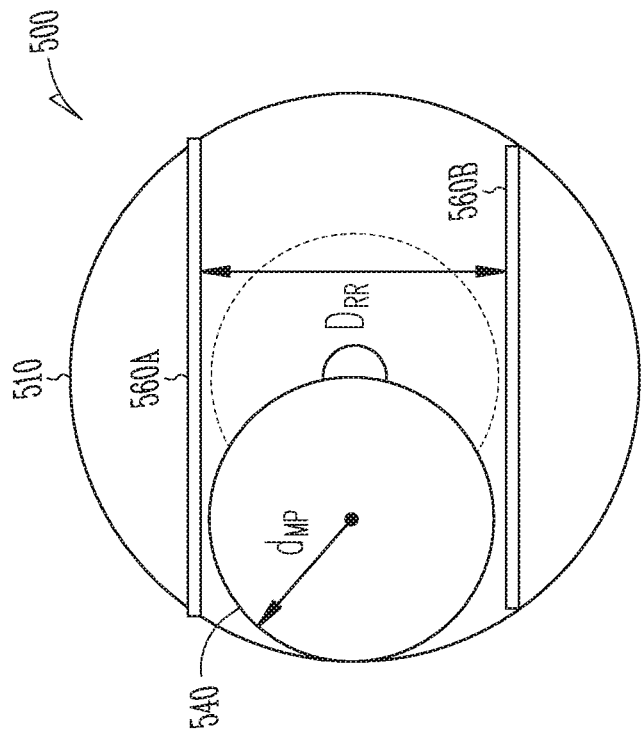
FIGS. 5A-5C are diagrams illustrating different views of an exemplary sensor node mounting assembly with a biased through hole.
Figure 5B:
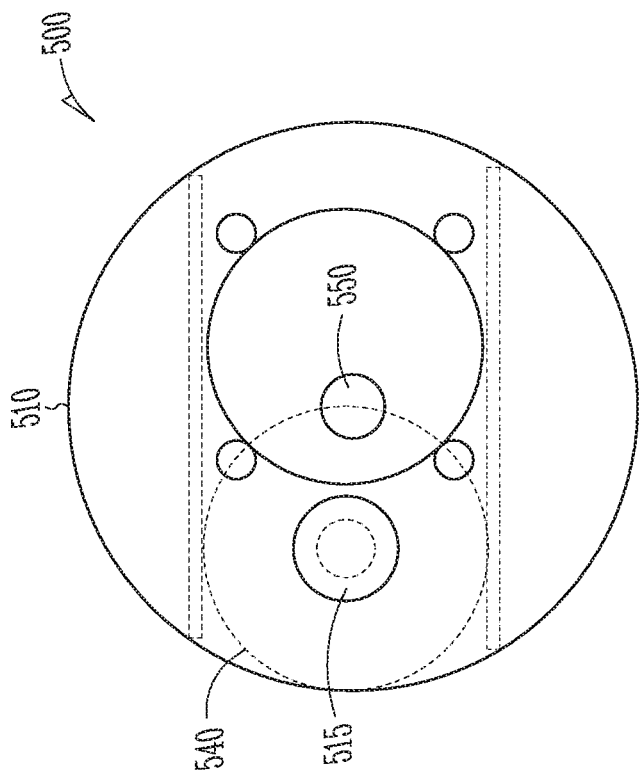
Figure 5C:
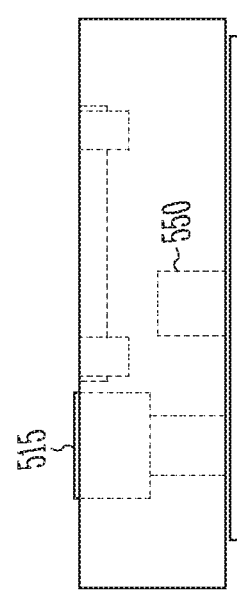

FIGS. 5A-5C are diagrams illustrating different views of an exemplary sensor node mounting assembly 500, which can be a variant of the sensor node 200. The sensor node fixation assembly 500 includes a base 510, and a fixation member (not shown), such as the fixation member 230. As a variant of the substantially centered through hole 215 or 315 respectively shown in FIGS. 2 and 3, the base 510 has a biased through hole 515 not centered on the base 210. The biased through hole 515 can be sized to allow a fixation member (e.g., a bolt or a screw) to pass through and thereby engaging the base 510. The fixation member can extend beyond the bottom of the base 510, and thread-engage with the machine surface via the distal threaded portion.

The base 510 may include a blind hole 550 to accommodate a mounting stud (not shown). The blind hole 550 opens at the bottom exterior surface of the base 510, such that a mounting stud can be inserted therefrom into the blind hole 550. In an example, the blind hole 550 is threaded. The mounting stud has threaded portions on both proximal and distal ends. The proximal threaded portion of the mounting stud can be screwed into the threaded blind hole 550 and tightened therein. The distal threaded portion can be screwed into a prepared tapped hole on the machine surface and tightened to a specific mounting torque. The fixation via the biased through hole 515, in combination with the stud mounting via the blind hole 550, can strengthen and stabilize the base 510 (and thus the sensor node) on the machine, and improve sensor frequency response with a broad usable sensor frequency range.

In some examples, the sensor node fixation assembly 500 can include a mounting pad 540, which can be a variant of the mounting pad 440. The mounting pad 540 has a substantially centered through hole concentrically aligned with the through hole 515 on the base 510. A fixation member can be inserted or threaded into the through hole 515 and the mounting pad hole, from the internal of the sensor node outward to the external of the sensor node, and further engage with the mounting pad. The mounting pad 540 can be affixed to the machine surface using invasive or non-invasive means. In an example, the mounting pad 540 can be used in combination with the stud mounting via the blind hole 550 to strengthen and stabilize the base 510 (and thus the sensor node) on the machine.

In some examples, the sensor node fixation assembly 500 can include at least two mounting rails 560A-560B securely attached to the exterior of the base 510. The mounting rails 560A-560B can conform to the shape of the machine surface (e.g., a curve shape), and frictionally stabilize the base 210 and the entire sensor node on the machine. In the example as illustrated in FIG. 5C, the cylindrical-shaped mounting pad 540 has a circular base-contacting face with a diameter or $d_{MP}$. The spacing $D_{RR}$ between the mounting rails 560A-560B can be greater than $d_{MP}$, such that the mounting pad 540 can be attached to the base 510 between the mounting rails 560A-560B. The through hole 515 can be locate between the mounting rails 560A-560B. The through hole 515 may be positioned on the base 210 such that, when the through hole 515 and the mounting pad hole are concentrically aligned to each other, the mounting pad 540 is in full contact with the exterior of the bottom of the base 510. A full contact between the mounting pad 540 and the base 510 may improve the stability of the base and mounting pad on the machine.

Figure 6B:
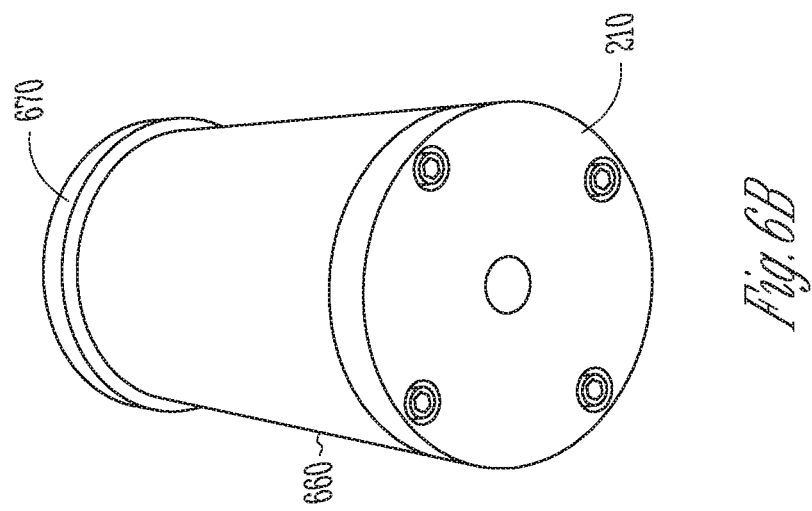
FIGS. 6A-6B illustrate an example of sensor node packaging with circuits and parts to sense information of machine characteristic.
Figure 6A:
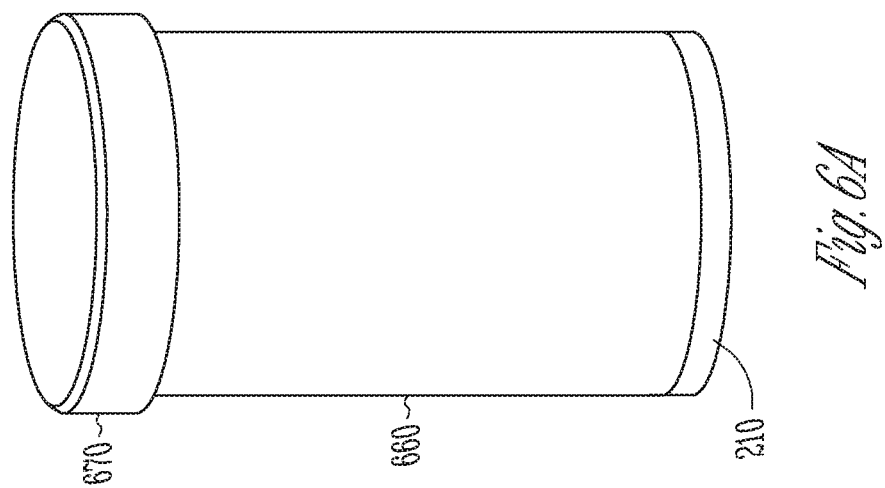

FIGS. 6A-6B illustrate an example of sensor node packaging 600 that includes a case 660 configured to enclose circuits and parts for sensing and processing information of machine characteristic. The case 660 can be detachably affixed to the base 210 by a user via respective coupler on the case 660 and/or the base 210. In an example, the coupler can be mounted on an exterior surface of base 210 and an interior surface of the case 660. Examples of the coupler may include a snap-fit coupling, a threaded or other rotation or screw-in coupling, a slide-in engagement, or one or more other locking mechanisms. In an example, the case 660 has a tubular body with one open end coupled to the base 210, and an opposite open end coupled to a removable lid 670. In an example, the lid 670 and the case 660 can be joined together. The case 660 and the base 210 define an enclosure to house mechanical and electrical parts for sensor data acquisition, processing, storage, and transmission, including one or more of memory circuit, a communication circuit, batteries, etc. In some examples, enclosed in the case 660 may include memory slots to receive one or more external storage devices, such as SD cards or flash memories, which may be used to store sensor data and other information. The components may be arranged inside the case 660 in specific orientation to allow for easy access. In some examples, the sensor node may include an indicator of node functionality, such as a light-emitting diode (LED) or other visual indicators. The sensor node packaging 600 may be used as a master node in a sensor network configured to cooperatively monitor machine operating condition and to detect and diagnose machine faults, as to be discussed in the following with reference to FIG. 7.

Figure 7:
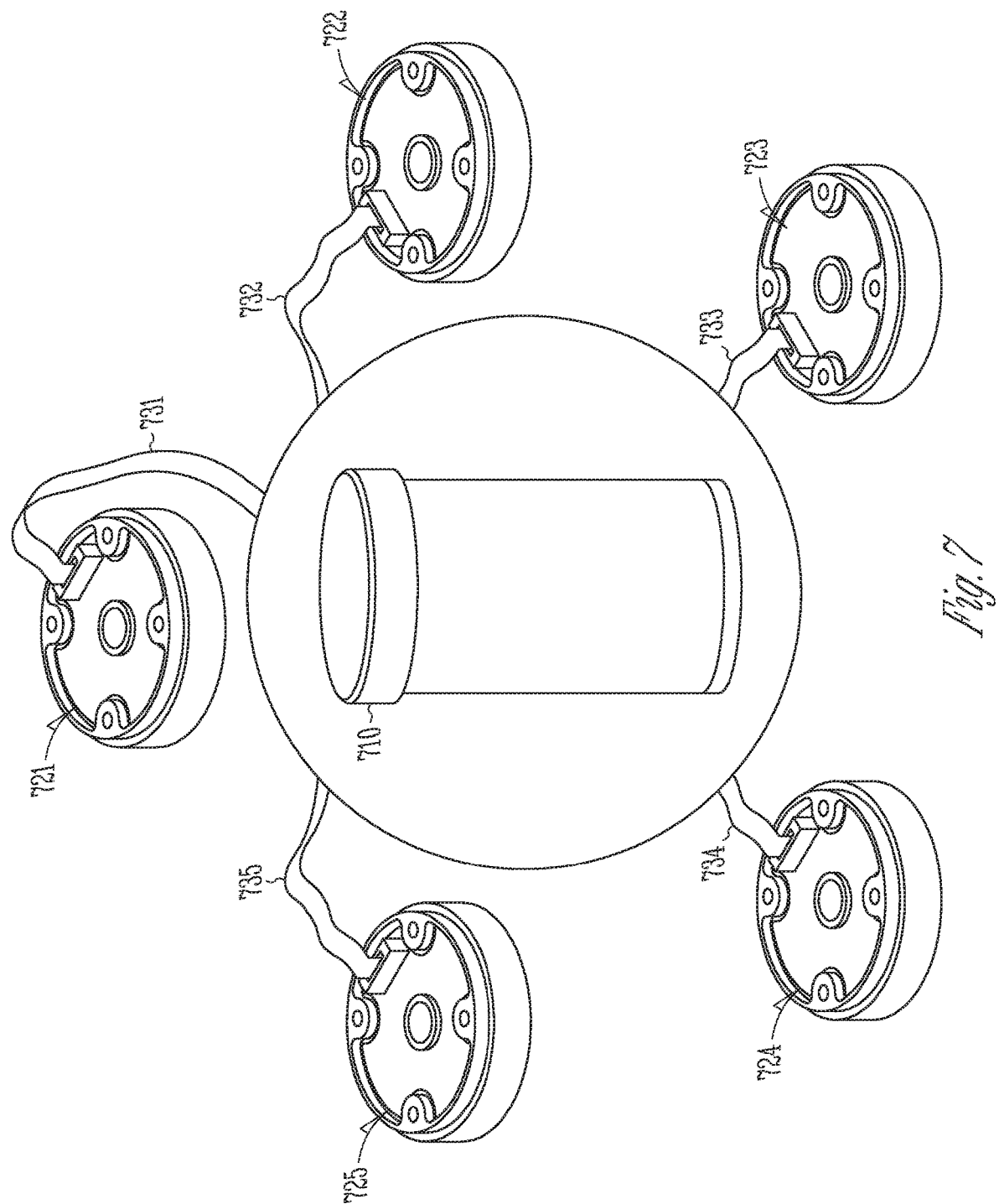
FIG. 7 is a diagram illustrating an example of a portion of a hierarchical sensor network for machine operating condition monitoring.

FIG. 7 is a diagram illustrating an example of a portion of a hierarchical sensor network 700 for machine condition monitoring. The sensor network 700 is an embodiment of the network of edge nodes 110 as illustrated in FIG. 1. The hierarchical sensor network 700 can be partitioned into different clusters. FIG. 7 illustrates such a cluster including a master node 710 and a plurality of member sensor nodes, such as 721-725, communicatively coupled to the master node 710. It is to be understood that the five member nodes 721-725 are by way of example but not limitation. In an example, the size of a cluster, such as the number of member sensor nodes, may be configurable by a user.

The member nodes 721-725 may each include a sensor node mounting assembly 200, and can be mounted on different machines or machine parts. In an example, the member nodes 721-72.5 may have the same sensor modality. In another example, the member nodes 721-725 may have two or more different sensor modalities, such as an accelerometer to detect vibration, a microphone or acoustic sensor to detect sound, a current sensor to detect current flowing in a machine (e.g., a motor), a magnetic field sensor to detect magnetic field, an electric field sensor to detect electrical field, or a temperature sensor to sense the temperature, etc.

The master node 710 may also be mounted on a machine such as using the mounting assembly 200. The mast node 710 can be a central hub of a cluster of sensor nodes. The master node 710 can receive sensor data, or signal features, from the member sensor nodes 721-725, and exchanges information with a host application. In an example, the member sensor nodes 721-725 may be coupled to the master node 710 via respective wired connection 731-735. In an example, the wired connection 731-735 may have extendable or otherwise adjustable length, such that the member nodes 721-725 can be deployed to various machines or machine parts located in a wide range of distance from the master node 710. The member nodes 721-725 can have limited power consumption, and computation and communication capabilities. The member nodes 721-725 can be powered by the master node 710 via the wired connections 731-735. In an example, the member nodes 721-725 have no batteries or antenna (for wireless communication). The small size and low profile of the member nodes improve the ease of use, and reduce the design and manufacturing cost.

The master node 710 can take the form of the sensor node packaging 600 as shown in FIG. 6. The master node 710 can include a power supply (e.g., a battery pack) to power its sensing circuitry as well as the member nodes 750. The master node 710 can further include circuits or functional modules to receive data from the member nodes 721-725, analyze the data (e.g., generating analytics, performing FFT), and generate metrics or signal features. The master node 710 can include an antenna and a transceiver circuit to communicate with the gateways 120 and the cloud-computing device 130, as discussed above with reference to FIG. 1. In an example, the transceiver may generate electromagnetic waves for data transmission. In some examples, data transmission between the master node 710 and the cloud-computing device 130 can include at least in part a wired connection.

Figure 8:
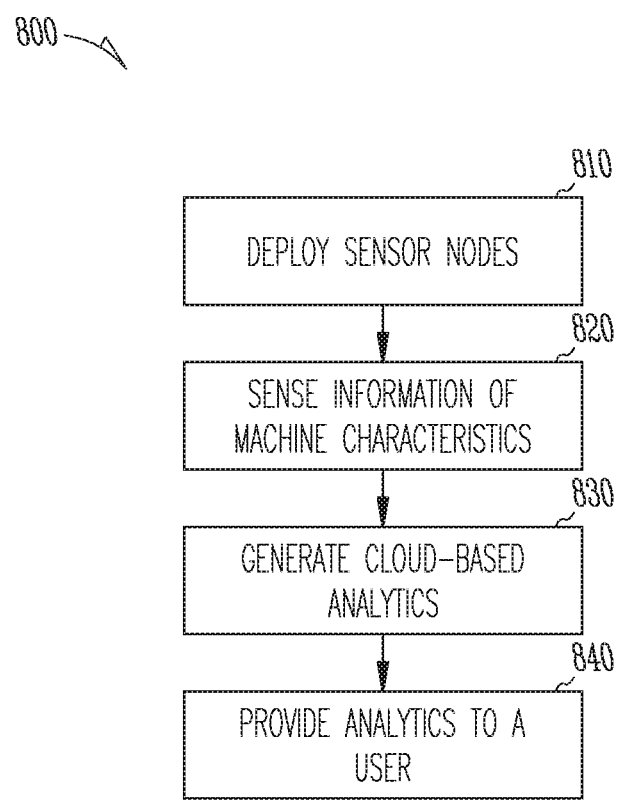
FIG. 8 is a flow-chart illustrating a method of condition-based monitoring of machine health status using cloud services.

FIG. 8 is a flow-chart illustrating an exemplary method 800 of condition-based monitoring of machine health status using cloud services, including machine fault detection and diagnosis. The method 800 may be implemented in, and executed by, a machine health monitoring system, such as the system 100 as discussed above.

The method 800 commences at 810, where multiple sensor nodes, such as the sensor nodes 110, may be deployed to machines or machine parts. Examples of sensor nodes, including mounting assembly and circuitry for data acquisition and processing, are illustrated in FIGS. 2-6. The sensor nodes may be inter-communicated and synchronized to form a wireless sensor network, such as illustrated in FIGS. 1 and 8. The sensor nodes may be mounted respectively on machines or machine parts invasively or non-invasively. Examples of method for affixing a sensor node on a machine is discussed below with reference to FIG. 9.

At 820, information of machine characteristic may be monitored using the sensor nodes. The sensor nodes may each include one or more sensor types configured to sense one or more machine characteristics such as vibration, energy profiles, magnetic field, temperature, or acoustic information produced by the rotational movement of machine components. In an example, the sensor nodes each include accelerometers configured to sense vibration information, and a data acquisition system to acquire the sensor data. In an example, the sensor nodes may be mounted at or close to a rotational element of a machine, such as a motor, a gearbox, or a bearing, and the sensor data acquired therefrom may contain information of rotations of the machine parts. The sensor data may be pre-processed, such as amplification, filtering, and other signal conditioning. Physical and statistical features, health indicators, and diagnostic features can be extracted from the pre-processed sensor data, such as using the microprocessor 320. The features or indicators may be extracted or derived from time-domain analysis, frequency-domain or spectral analysis, joint time-frequency analysis, or analysis in other transformed domain, of the sensor data. In an example, the extracted features may include an estimate of rotation speed, such as RPM, of a rotating machine. The RPM may be estimated using a FFT spectrum of the sensor data. The extracted features may be stored in an internal memory or an external storage device (e.g., a SD card or an external flash memory) of the sensor node.

The extracted features may be transferred to a cloud server for machine fault detection and analysis. The cloud server, such as the cloud 130, can be a computing device configured to provide cloud-based service (storage, analytics, maintenance etc.). In some examples, communication between the sensor nodes and the cloud may involve one or more gateways.

At 830, machine analytics may be generated at the cloud using the features produced at and provided by the sensor nodes. A feature subset may be selected from the received features, such as via an unsupervised learning process, and machine anomaly may be detected using the selected feature set. The machine fault can be detected using RPM readings, FFT spectral features at characteristic frequencies, a statistical distribution of a temporal or spectral feature, time-frequency analysis, among others. The detected fault may further be classified into one of fault type, such as bearing fault, shaft fault (different speed), mounting error, and gearbox fault (losing teeth). In an example, fault classification may involve comparing the extracted feature, or a statistical distribution of the extracted feature, to a template contains signatures of a corresponding fault type.

At 840, fault detection and diagnostics may be provided to a user. The user may access the data and services in the cloud via one or more locally configured clients or remote clients that are securely connected to the cloud, such as PCs, tablets, mobile phones or other mobile devices in communication with the cloud via Internet connection. In an example, fault analytics (e.g., detection, diagnostics, or prognostics) may be displayed on a user interface (e.g., a display screen) in a form of interactive dashboard. In some examples, alert notification may be generated and sent to the user. Upon alert notification, the user may view that status, interpret the results, and take actions such as performing further test, make necessary repairs or other preventive or corrective actions.

Figure 9:
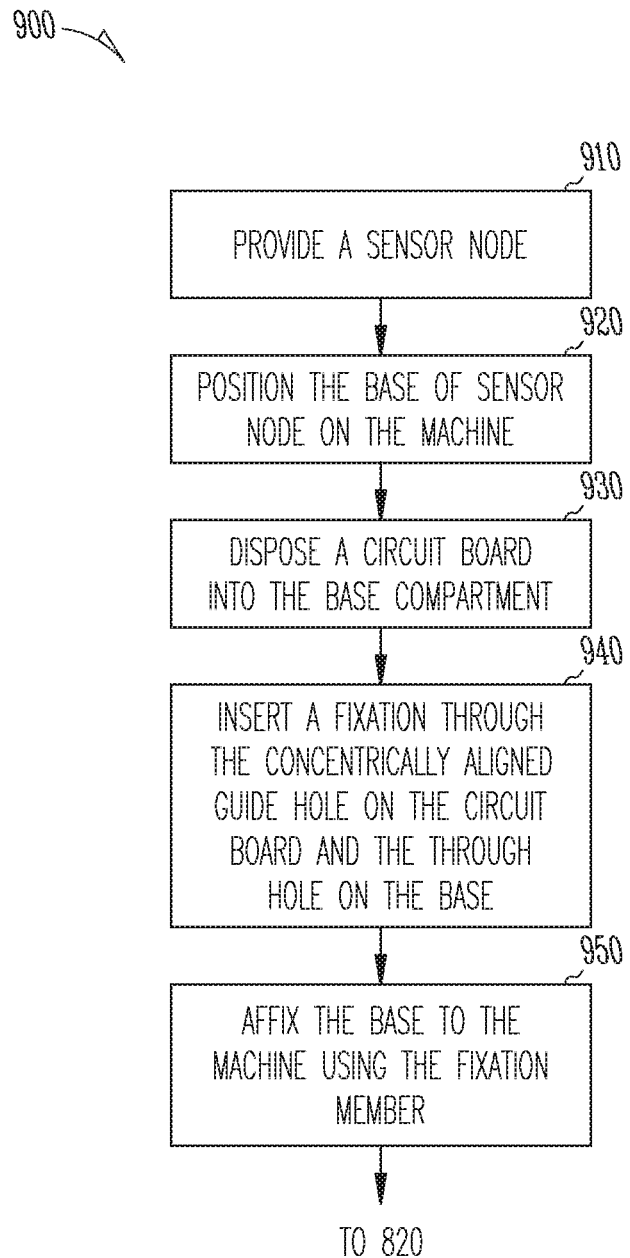
FIG. 9 is a flow-chart illustrating a method of affixing a sensor node on a machine surface.

FIG. 9 is a flow-chart illustrating an example of a method 900 of affixing a sensor node on a machine surface. The method 900 can be an embodiment of the step 810 of the method 800. A sensor node may be provided at 910. The sensor node comprises a mounting assembly and a circuit board, where the mounting assembly may include a base and a fixation member. As discussed above with reference to one or more of FIGS. 2-6, the base includes a base floor and a raised peripheral edge along the perimeter of the base floor. The peripheral edge and the base floor define a base compartment that can hold the circuit board. In an example, the base floor has a substantially circular shape. The base floor may include a substantially centered through hole, and a raised lip around the perimeter of the through hole. The circuit board can have a guide hole, which can be substantially centered on the circuit board and operatively aligned to the through hole of the base floor.

At 920, the base of the mounting assembly can be positioned on the machine. In one example, the exterior surface of the base can be in direct contact with the machine. In another example, a mounting pad can be attached to an exterior of the base floor, such as the mounting pad 440 or 540 as illustrated in FIGS. 4-5. The mounting pad can have a substantially centered hole. The mounting pad hole can be concentrically aligned with the through hole on the base floor. The base and the mounting pad can be detachably bound together using the fixation member, which passes through the through hole on the base floor and the mounting pad hole concentrically aligned to each other.

At 930, the circuit board can be disposed within the base compartment. The guide hole on the circuit board can be coupled to the raised lip on the base around the through hole. The raised lip thus guides disposition of the circuit board into the base compartment. In some examples, the raised lip can function as a depth-limiting shoulder that prevents the fixation member from directly contacting and compressing against the circuit board. That can help avoid excessive stress and damage to the circuit board. The raised lip structure also saves more circuit board space for the electrical components and circuitry.

At 940, the fixation member can be inserted from the base compartment outward through the concentrically aligned guide hole and the through hole, and extend beyond the exterior of the base bottom. Orientation of the base on the machine may be adjusted by rotating the base around the fixation member, such as to re-align the sensor node with respect to the rotating machine part to better sense vibration at a particular direction (e.g., along the axial direction of a shaft of a motor), or to conveniently adapt to different machine surface conditions.

At 950, the base can be affixed to the machine using the fixation member. The fixation member can have a distal threaded portion extending beyond the bottom of the base and thread-engages directly onto a machine surface. Alternatively, the distal threaded portion can thread-engage with the mounting pad 440 or 540 as illustrated in FIGS. 4-5. The mounting pad can include invasive or non-invasive mounting means to affix to the machine, such as adhesive mounting or magnetic mounting. Once the sensor node is securely affixed on the machine, it can sense machine characteristic information using one or more sensors during normal operation of the machine, according to step 820 of the method 800.

Various embodiments are illustrated in the figures above. One or more features from one or more of these embodiments may be combined to form other embodiments. The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should, therefore, be determined with references to the appended claims, along with the full scope of equivalents to which such claims are entitled.

What is claimed is:

1. A sensor node for monitoring an operating condition of a machine, comprising:
    a mounting assembly, including:
        a base having a base floor and a raised peripheral edge on the base floor, the raised peripheral edge and the base floor defining a base compartment; and
        a fixation member configured to engage the base via a through hole on the base floor and to removably affix the base to the machine; and
    a circuit board sized and shaped to fit within the base compartment, the circuit board including circuitry configured to receive information of machine characteristic;
    wherein the circuit board defines a guide hole concentrically aligned with the through hole on the base floor when the circuit board is located within the base compartment, and the fixation member is configured to pass through the concentrically aligned guide hole on the circuit board and the through hole on the base floor to engage the base.

2. The sensor node of claim 1, wherein the through hole is substantially centered on the base floor.

3. The sensor node claim 1, further comprising a watertight seal at an interface between the fixation member and the raised lip.

4. The sensor node of claim 1, wherein the fixation member is configured to be inserted from the base compartment outward to an exterior of the base.

5. The sensor node of claim 4, wherein the fixation member includes a bolt having a head and a shank, wherein, to engage the base:
    the shank is configured to pass through the concentrically aligned through hole on the base floor and the guide hole on the circuit board, and to extend beyond the exterior of the base and thread-engage with the machine; and
    the bolt head is configured to remain in the base compartment.

6. The sensor node of claim 1, wherein the mounting assembly further includes a mounting pad detachably attached to an exterior of the base floor using the fixation member, the mounting pad having a hole substantially centered on the mounting pad, and
    wherein the fixation member is configured to detachably bind the base and the mounting pad via the hole on the base floor and the mounting pad hole concentrically aligned to each other.

7. The sensor node of claim 6, wherein the mounting pad hole is threaded, and the fixation member is configured to thread-engage the threaded mounting pad hole to bind the base and the mounting pad.

8. The sensor node of claim 6, wherein the mounting pad has a cylindrical body with a first circular face in full contact with the base floor, and a second circular face, opposite to the first circular face, affixed to the machine via an adhesive or a magnetic mounting means.

9. The sensor node of claim 1, wherein the circuitry is coupled to one or more sensors to sense a machine characteristic including one or more of:
    an accelerometer configured to sense vibration;
    a magnetic field sensor configured to sense magnetic field;
    a temperature sensor configured to sense temperature; or
    an acoustic sensor configured to sense acoustic information.

10. The sensor node of claim 1, further comprising a case detachably affixed to the base, the case and the base defining an enclosure to house one or more of:
    a memory circuit;
    a communication circuit; or
    a battery.

11. A system for monitoring machine operating condition, the system comprising:
    a sensor network including sensor nodes configured to be mounted on respective machine parts, receive information of machine characteristic from the respective machine parts, and provide the received information of machine characteristic to a cloud-based service for assessing machine operating condition;
    wherein the sensor nodes each including:
    a mounting assembly, including (1) a base having a base floor and a raised peripheral edge on the base floor, the raised peripheral edge and the base floor defining a base compartment; and (2) a fixation member configured to engage the base via a through hole on the base floor and to removably affix the base to the machine; and
    a circuit board sized and shaped to fit within the base compartment, the circuit board including circuitry configured to receive information of machine characteristic;
    wherein the circuit board defines a hole concentrically aligned with the through hole on the base floor when the circuit board is located within the base compartment, and the fixation member is configured to pass through the concentrically aligned guide hole on the circuit board and the through hole on the base floor to engage the base.

12. The system of claim 11, comprising a cloud-computing device communicatively coupled to the sensor network, the cloud-computing device configured to provide the cloud-based service including one or more of:
    detecting presence or absence of a machine fault;
    generating an indicator of time to machine failure;
    diagnosing a fault type; or
    generating an alert or a report of a machine fault on a client device.

13. The system of claim 12, wherein the sensor network is a hierarchical network including at least one master node communicatively coupled to two or more member nodes, both the master node and the two or more member nodes selected from the sensor nodes,
    wherein the master node includes a power supply and a communication circuit configured to communicate with the cloud-computing device.

14. A method of monitoring an operating condition of a machine using a sensor node, the method comprising:
    providing a sensor node, the sensor node comprising (1) a mounting assembly including a base and a fixation member, and (2) a circuit board having a guide hole;
    positioning the base of the mounting assembly on the machine, the base including a base floor with a substantially centered through hole and a raised peripheral edge on the base floor, the raised peripheral edge and the base floor defining a base compartment for receiving the circuit board, the guide hole on the circuit board and the through hole on the base floor concentrically aligned to each other;
    inserting the fixation member from the base compartment outward through the concentrically aligned guide hole and the through hole, and extending beyond the exterior of the base; and
    affixing the base to the machine using the fixation member.

15. The method of claim 14, comprising:
    fitting the guide hole on the circuit board over a raised lip around a perimeter of the through hole, the raised lip extending above the base floor; and
    disposing the circuit board into the base compartment.

16. The method of claim 14, wherein affixing the base to the machine includes extending a distal threaded portion of the fixation member beyond the exterior of the base, and thread-engaging the machine using distal threaded portion.

17. The method of claim 14, further comprising adjusting an orientation of the base on the machine by rotating the base around the fixation member.

18. The method of claim 14, further comprising binding a mounting pad to an exterior of the base floor via an adhesive mounting or magnetic mounting means, including passing the fixation member through (1) the through hole on the base floor and (2) a substantially centered hole on the mounting pad operatively aligned concentrically to the through hole.

19. The method of claim 14, further comprising:
    sensing information of machine characteristic using the sensor node;
    generating machine condition analytics using a cloud-based service, the machine condition analytics including detection of a machine fault or diagnosis of a fault type using information of machine characteristic; and
    alerting a user of the generated machine condition analytics.

* * * * *

UNITED STATES PATENT AND TRADEMARK OFFICE
CERTIFICATE OF CORRECTION

PATENT NO. : 10,782,675 B2  
APPLICATION NO. : 16/219392  
DATED : September 22, 2020  
INVENTOR(S) : John Martin Mangino Page 1 of 1

It is certified that error appears in the above-identified patent and that said Letters Patent is hereby corrected as shown below:

On the Title Page

Item [73], delete "Inc," and insert --Inc.,-- therefor

In the Claims

Column 23, Line 59, Claim 1, delete "base." and insert --base, wherein the base floor of the sensor node includes a raised lip extending above the base floor around a perimeter of the through hole, the raised lip sized to couple to the guide hole on the circuit board to guide placement of the circuit board into the base compartment.-- therefor Column 23, Line 62, in Claim 3, after "node", insert --of--

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*